United States Patent
Lee et al.

(10) Patent No.: US 12,107,265 B2
(45) Date of Patent: Oct. 1, 2024

(54) NEGATIVE ELECTRODE ACTIVE MATERIAL, PREPARATION METHOD THEREOF, AND NEGATIVE ELECTRODE AND SECONDARY BATTERY INCLUDING SAME

(71) Applicant: LG ENERGY SOLUTION, LTD., Seoul (KR)

(72) Inventors: Su Min Lee, Daejeon (KR); Yong Ju Lee, Daejeon (KR); Jung Hyun Choi, Daejeon (KR); Se Mi Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 285 days.

(21) Appl. No.: 17/606,636

(22) PCT Filed: Nov. 30, 2020

(86) PCT No.: PCT/KR2020/017322
§ 371 (c)(1),
(2) Date: Oct. 26, 2021

(87) PCT Pub. No.: WO2021/118144
PCT Pub. Date: Jun. 17, 2021

(65) Prior Publication Data
US 2022/0231280 A1 Jul. 21, 2022

(30) Foreign Application Priority Data
Dec. 11, 2019 (KR) .................. 10-2019-0164281

(51) Int. Cl.
| H01M 4/48 | (2010.01) |
| H01M 4/36 | (2006.01) |
| H01M 4/58 | (2010.01) |
| H01M 4/02 | (2006.01) |

(52) U.S. Cl.
CPC ............ *H01M 4/366* (2013.01); *H01M 4/48* (2013.01); *H01M 4/5825* (2013.01); *H01M 2004/021* (2013.01); *H01M 2004/027* (2013.01)

(58) Field of Classification Search
CPC ...... H01M 4/366; H01M 4/48; H01M 4/5825; H01M 2004/021; H01M 2004/027
See application file for complete search history.

(56) References Cited

U.S. PATENT DOCUMENTS

| 2015/0140434 A1 | 5/2015 | Jung |
| 2018/0090750 A1 | 3/2018 | Oh et al. |
| 2018/0261833 A1 | 9/2018 | Hirose et al. |
| 2018/0269475 A1* | 9/2018 | Oh ........................ H01M 4/364 |
| 2018/0342757 A1 | 11/2018 | Choi et al. |
| 2020/0235383 A1 | 7/2020 | Shin et al. |
| 2020/0295352 A1 | 9/2020 | Oh |
| 2020/0350571 A1 | 11/2020 | Lee et al. |
| 2020/0388833 A1 | 12/2020 | Lee et al. |
| 2021/0074995 A1 | 3/2021 | Shin et al. |
| 2021/0351432 A1 | 11/2021 | Choi et al. |

FOREIGN PATENT DOCUMENTS

| CN | 106537659 A | 3/2017 |
| CN | 108292745 A | 7/2018 |
| CN | 108630887 A | 10/2018 |
| EP | 3343677 A1 | 7/2018 |
| JP | 2010-170943 A | 8/2010 |
| JP | 2017-204374 A | 11/2017 |
| JP | 6397642 B2 | 9/2018 |
| KR | 10-2005-0090220 A | 9/2005 |
| KR | 10-0570617 B1 | 4/2006 |
| KR | 10-0578871 B1 | 5/2006 |
| KR | 10-2013-0044627 A | 5/2013 |
| KR | 10-1427743 B1 | 8/2014 |
| KR | 10-2015-0057730 A | 5/2015 |
| KR | 10-2015-0062918 A | 6/2015 |
| KR | 10-1586816 B1 | 1/2016 |
| KR | 10-2017-0074030 A | 6/2017 |
| KR | 10-2018-0106485 A | 10/2018 |
| KR | 10-2019-0066596 A | 6/2019 |
| KR | 10-2019-0092311 A | 8/2019 |
| KR | 10-2019-0093176 A | 8/2019 |
| KR | 10-2019-0104895 A | 9/2019 |
| WO | 2019/107990 A1 | 6/2019 |
| WO | 2019/151813 A1 | 8/2019 |
| WO | 2019/168352 A1 | 9/2019 |

OTHER PUBLICATIONS

International Search Report (with partial translation) and Written Opinion issued in corresponding International Patent Application No. PCT/KR2020/017322, dated Mar. 12, 2021.
International Search Report issued in corresponding International Patent Application No. PCT/KR2020/017322 issued dated Mar. 12, 2021.
Written Opinion issued in corresponding International Patent Application No. PCT/KR2020/017322 issued dated Mar. 12, 2021.
Extended European Search Report dated Jun. 14, 2022 issued by the European Patent Office in corresponding European Patent Application No. 20898442.7.

* cited by examiner

*Primary Examiner* — Jane J Rhee
(74) *Attorney, Agent, or Firm* — Bryan Cave Leighton Paisner LLP

(57) ABSTRACT

The present invention relates to a negative electrode active material including silicon-based oxide particles and a metal distributed on a surface, inside, or on the surface of and the inside the silicon-based oxide particles, wherein compressive fracture strength measured at a pressure of 100 mN is 170 MPa to 380 MPa, and the silicon-based oxide particles contain Si crystal grains having a crystal grain size of 3 nm to 20 nm.

14 Claims, No Drawings

NEGATIVE ELECTRODE ACTIVE MATERIAL, PREPARATION METHOD THEREOF, AND NEGATIVE ELECTRODE AND SECONDARY BATTERY INCLUDING SAME

CROSS-REFERENCE TO RELATED APPLICATIONS

This application claims the benefit of Korean Patent Application No. 10-2019-0164281, filed on Dec. 11, 2019, in the Korean Intellectual Property Office, the disclosure of which is incorporated herein in its entirety by reference.

TECHNICAL FIELD

The present invention relates to a negative electrode active material, and a method for preparing the same, and a negative electrode and a secondary battery including the same.

BACKGROUND ART

Recently, the demand for a small and lightweight secondary battery having a relatively high capacity is rapidly increased due to the rapid spread of electronic devices using batteries, such as cell phones, notebook computers, electric vehicles, and the like. Particularly, a lithium secondary battery is lightweight and has a high energy density, and thus, is attracting attention as a driving power source for portable devices. Therefore, research and development efforts for improving the performance of a lithium secondary battery have been actively conducted.

Typically, a lithium secondary battery includes a positive electrode, a negative electrode, a separator interposed between the positive electrode and the negative electrode, an electrolyte, an organic solvent, and the like. In addition, a positive electrode and a negative electrode may have an active material layer including a positive electrode active material or a negative electrode active material on a current collector. In the positive electrode, a lithium-containing metal oxide such as $LiCoO_2$, and $LiMn_2O_4$ is used as a positive electrode active material, and accordingly, in the negative electrode, a carbon-based active material or a silicon-based negative electrode active material not containing lithium is used as a negative electrode active material.

Particularly, among negative electrode active materials, a silicon-based negative electrode active material is attracting attention in that it has a capacity of about 10 times higher than that of a carbon-based negative electrode active material, and due to the high capacity thereof, the silicon-based active material has the advantage of being able to achieve a high energy density even with a thin electrode. However, a silicone-based negative electrode active material is not universally used due to the problem of volume expansion according to charge/discharge and cracks/damage to active material particles caused thereby, and the deterioration in lifespan properties caused thereby.

Therefore, there is a demand for the development of a secondary battery capable of improving lifespan properties while implementing the high capacity and high energy density of a silicon-based negative electrode active material.

Korean Patent Laid-Open No. 10-2017-0074030 relates to a negative electrode active material for a lithium secondary battery, a method for preparing the same, and a lithium secondary battery including the same, and discloses a negative electrode active material including a porous silicon-carbon composite. However, there is a limit in solving the above-mentioned problems.

PRIOR ART DOCUMENT

Patent Document

Korean Patent Laid-open Publication No. 10-2017-0074030

DISCLOSURE OF THE INVENTION

Technical Problem

An aspect of the present invention provides a negative electrode active material capable of preventing volume expansion during charge/discharge, and damage to the active material in using a silicon-based negative electrode active material.

Another aspect of the present invention provides a method for preparing the above-described negative electrode active material.

Yet another aspect of the present invention provides a negative electrode and a secondary battery including the above-described negative electrode active material.

Technical Solution

According to an aspect of the present invention, there is provided a negative electrode active material including silicon-based oxide particles and a metal distributed on a surface, inside, or on the surface of and the inside the silicon-based oxide particles, wherein compressive fracture strength measured at a pressure of 100 mN is 170 MPa to 380 MPa, and the silicon-based oxide particles contain Si crystal grains having a crystal grain size of 3 nm to 20 nm According to another aspect of the present invention, there is provided a method for preparing the above-described negative electrode active material, wherein the method includes the steps of mixing silicon-based oxide particles and a metal-containing material and heat-treating the mixture at 1,050° C. to 1,350° C.

According to another aspect of the present invention, there is provided a negative electrode including a negative electrode current collector and a negative electrode active material layer formed on the negative electrode current collector, wherein the negative electrode active material layer includes a negative electrode material containing the above-described negative electrode active material.

According to another aspect of the present invention, there is provided a secondary battery including the negative electrode described above, a positive electrode opposing the negative electrode, a separator interposed between the negative electrode and the positive electrode, and an electrolyte.

Advantageous Effects

A negative electrode active material of the present invention includes silicon-based oxide particles and a metal distributed on the surface thereof and/or thereinside and has a compressive fracture strength in a specific range, and the silicon-based oxide particles include Si crystal grains having a crystal grain size in a specific range. A negative electrode active material having a metal doped thereinside and having a compressive fracture strength in the above range may prevent active material damage due to volume expansion of silicon-based oxide particles, thereby improving lifespan performance and reducing the phenomenon of swelling to an excellent level. In addition, by adjusting the size of Si crystal grains in the silicon-based oxide particles to be in the above range, it is possible to adjust the particle strength and to minimize changes in the internal structure of the active material during charging, thereby improving lifespan performance. Accordingly, a negative electrode and a secondary battery using the negative electrode active material according to the present invention are excellent in lifespan performance, and may preferably implement excellent capacity properties of silicon-based oxide particles.

MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include", "comprise", or "have" are intended to specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a submicron region to several millimeters, so that results of high reproducibility and high resolution may be obtained.

Hereinafter, the present invention will be described in detail.

<Negative Electrode Active Material>

The present invention relates to a negative electrode active material. The negative electrode active material may be preferably used for a lithium secondary battery.

The negative electrode active material of the present invention includes silicon-based oxide particles and a metal distributed on a surface, inside, or on the surface of and the inside the silicon-based oxide particles, wherein compressive fracture strength measured at a pressure of 100 mN is 170 MPa to 380 MPa, and the silicon-based oxide particles contain Si crystal grains having a crystal grain size of 3 nm to 20 nm.

Typically, a silicon-based negative electrode active material is known to have a capacity of about 10 times higher than that of a carbon-based active material, and accordingly, when the silicon-based negative electrode active material is applied to a negative electrode, it is expected that a thin-film electrode which is thin but has a high level of energy density may be implemented. However, a silicon-based negative electrode active material has a problem of lifespan deterioration due to the volume expansion/contraction caused by the intercalation/de-intercalation of lithium according to charge/discharge. Particularly, when charging and discharging silicon-based oxide particles, the active material is damaged according to rapid volume expansion/contraction of the active material, and there is a problem in that such damage to the active material accelerates the deterioration in lifespan.

In order to solve the above limitation, the negative electrode active material of the present invention includes a metal doped or distributed on the surface of and/or inside the silicon-based oxide particles, and is characterized by adjusting compressive fracture strength and the size of Si crystal grains in the silicon-based oxide particles to be in a specific range. Accordingly, it is possible to control the volume expansion/contraction of the active material during charging and discharging to an appropriate level, and damage to the active material is prevented to improve the lifespan properties of the negative electrode active material to an excellent level. In addition, by adjusting the size Si crystal grains in the silicon-based oxide particles to be in the above range, it is possible to adjust the particle strength and to minimize changes in the internal structure of the active material during charging, thereby improving lifespan performance. In addition, when a negative electrode active material having the compressive fracture strength is used, the excellent capacity properties of silicon-based oxide particles are not inhibited, and since the negative electrode active material has a desirable level of roll-pressing properties, it is possible to implement a negative electrode and a secondary battery having excellent capacity and life properties.

The silicon-based oxide particles are capable of intercalation/de-intercalation of lithium, and may function as core particles of a negative electrode active material.

The silicon-based oxide particles may include a compound represented by Formula 1 below.

$$SiO_x \qquad \text{[Formula 1]}$$

In Formula 1 above, it may be 0<x<2.

In Formula 1 above, $SiO_2$ (when x=2 in Formula 1 above) does not react with lithium ions, and thus, cannot store lithium, so that it is preferable that x is within the above range. Specifically, in Formula 1 above, in terms of structural stability of an active material, x may be 0.5≤x≤1.5.

The silicon-based oxide particles contain Si crystal grains having a crystal grain size of 3 nm to 20 nm. In the present invention, a "crystal grain" means a single crystal grain unit having a regular atomic arrangement. When Si crystal grains having a crystal grain size in the above range are used, it is possible to improve particle strength to a desirable level, and to minimize changes in the internal structure of the active material during charging and discharging, thereby improving lifespan performance.

When the size of Si crystal grains in the silicon-based oxide particles is less than 3 nm, particle strength is lowered, so that particles are damaged at the time of volume expansion/contraction of the active material, and accordingly lifespan properties are deteriorated. When the size of Si crystal grains in the silicon-based oxide particles is greater than 20 nm, the internal structural change of the active material at the time of negative electrode charging is severe, so that lifespan performance is reduced.

The Si crystal grain size may preferably be 6 nm to 15 nm, more preferably 6.5 nm to 13.5 nm, and more preferably 9.5 nm to 10.5 nm, which is preferable in terms of further improving the lifespan properties by adjusting changes in the internal structure of the active material while improving compressive fracture strength to an appropriate level.

The Si crystal grain size may be obtained by performing XRD analysis on the silicon-based oxide particles using an X-ray diffraction (XRD) analysis device, obtaining the full width of half maximum and the angle (θ) of the (220) plane peak of Si, and then substituting the obtained the full width of half maximum and the angle into the Scherrer equation.

$$\text{Si crystal grain size(nm)}=K\times\lambda/\text{FWHM}\times\text{Cos }\theta \quad \text{[Scherrer equation]}$$

In the above Equation, K is the Scherrer constant, λ is the wavelength of a light source, FWHM is the full width of half maximum of the (220) plane peak of Si at the time of XRD analysis, and Cos θ is the cosine value of an angle θ corresponding to the (220) plane peak of Si.

The average particle diameter ($D_{50}$) of the silicon-based oxide particles may be 0.1 μm to 20 μm, preferably 1 μm to 10 μm, and more preferably 2 μm to 6 μm in terms of ensuring the structural stability of an active material during charge/discharge, preventing the level of volume expansion/contraction from increasing due to the excessive increase in particle diameter, and preventing initial efficiency from decreasing due to an excessively small particle diameter.

The silicon-based oxide particles may be included in the negative electrode active material in an amount of 75 wt % to 99 wt %, preferably 80 wt % to 97 wt %, and more preferably 87 wt % to 90 wt %. When in the above range, the metal content may be improved to an appropriate level, so that it is preferable in terms of improving the capacity of a negative electrode, and compressive fracture strength is controlled to an appropriate level, so that it is preferable in terms of improving battery lifespan properties.

The metal is distributed on the surface, inside, or on the surface of and inside the silicon-based oxide particles. The metal is in the form of being doped on the silicon-based oxide particles, and may be distributed on the surface of and/or inside the silicon-based oxide particles.

The metal may control the volume expansion/contraction of the silicon-based oxide particles to an appropriate level by being distributed on the surface of and/or inside silicon-based oxide particles, and may serve to prevent damage to an active material. In addition, the metal may be contained in terms of increasing the efficiency of the active material by lowering the ratio of the irreversible phase of silicon-based oxide particles (for example, $SiO_2$).

The metal may be included in the negative electrode active material in an amount of 0.1 wt % to 25 wt %, preferably 3 wt % to 15 wt %, and more preferably 5 wt % to 8 wt %. When in the above range, the effect of preventing damage to silicon-based oxide particles described above, and lifespan properties are more preferably implemented, and at the same time, it is preferable in terms of not inhibiting the excellent capacity properties of the silicon-based oxide particles.

The metal may be at least one selected from the group consisting of Li, Mg, and Al, preferably at least one selected from the group consisting of Li and Mg, and more preferably, in terms of implementing the effect of preventing damage to silicon-based oxide particles described above excellently and further improving the lifespan properties of the negative electrode active material due to the low reactivity with moisture thereof, Mg.

Specifically, the metal is Mg, and the Mg may be present in the negative electrode active material in the form of at least one magnesium silicate selected from the group consisting of $MgSiO_3$ and $Mg_2SiO_4$. As to be described later, the Mg may be present in the negative electrode active material in a metal silicate phase of $MgSiO_3$ and/or $Mg_2SiO_4$ depending on the control of heat-treatment conditions and the like of silicon-based oxide particles and a metal-containing material, and the metal silicate may serve to prevent particle destruction due to the volume expansion/contraction of the silicon-based oxide particles.

More specifically, the metal is Mg, and it is preferable that the Mg is present in the negative electrode active material in the form of $MgSiO_3$ and $Mg_2SiO_4$. When the Mg is present in two phases of $MgSiO_3$ and $Mg_2SiO_4$, $Mg_2SiO_4$ in particular, strong strength is imparted to particles, so that the mixed-phase structure in the negative electrode active material may contribute to improving the compressive fracture strength. The magnesium silicates may be implemented by controlling heat-treatment conditions during the preparation of a negative electrode active material. Specifically, when the heat-treatment of a metal-containing material (a metal raw material) and silicon-based oxide particles is performed at a low temperature, only $MgSiO_3$ is formed. However, when the heat-treatment is performed at an appropriate level of high temperature, it is possible to additionally form $Mg_2SiO_4$, so that a negative electrode active material in the form in which $MgSiO_3$ and $Mg_2SiO_4$ are mixed may be implemented.

More specifically, when the metal is Mg, the $MgSiO_3$ may be included in the negative electrode active material in an amount of 5 wt % to 25 wt %, preferably 11 wt % to 19 wt %, and more preferably 14 wt % to 17 wt %, and the $Mg_2SiO_4$ may be included in the negative electrode active material in an amount of 3 wt % to 30 wt %, preferably 7 wt % to 15 wt %, and more preferably 9 wt % to 12 wt %. When magnesium silicates are included in a negative electrode active material in the above range, the decrease in the capacity of silicon-based oxide particles due to excessive metal silicate content may be prevented and lifespan performance of the silicon-based oxide particles and the effect of preventing particle destruction due to volume expansion/contraction may be expressed to an excellent level. The content of the $MgSiO_3$ and $Mg_2SiO_4$ in a negative electrode active material may be implemented by adjusting heat-treatment conditions during the preparation of the negative active material to described later, and adjusting the content of a metal-containing material, and the like.

In addition, the metal is Mg, and when magnesium silicates of $MgSiO_3$ and $Mg_2SiO_4$ are present in a negative electrode active material, the ratio of the weight of the $Mg_2SiO_4$ to the weight of the $MgSiO_3$ may be 0.3 to 1.2, preferably 0.5 to 0.8. When $MgSiO_3$ and $Mg_2SiO_4$ are present in a negative electrode active material, the mixed-phase structure in the negative active material may improve the compressive fracture strength of the negative active material to an appropriate level, so that lifespan properties may be more preferably improved.

Meanwhile, the metal is Li, and the Li may be present in the negative electrode active material in the form of at least one lithium silicate selected from the group consisting of $Li_2SiO_3$ and $Li_2Si_2O_5$. Specifically, when the metal is Li, the $Li_2SiO_3$ may be included in the negative electrode active material in an amount of 1 wt % to 20 wt %, preferably 3 wt % to 10 wt %, and the $Li_2Si_2O_5$ may be included therein in an amount of 20 wt % to 60 wt %, preferably 30 wt % to 50 wt %. When in the above range, a desirable level of compressive breaking strength may be implemented to further improve the lifespan properties of a battery. When the metal is Li, the Li may additionally be present in the negative electrode active material in the form of lithium silicates of $Li_4SiO_4$ together with $Li_2SiO_3$, and/or $Li_2Si_2O_5$, but in terms of improving particle strength, $Li_4SiO_4$ may be included in the negative electrode active material in an amount of 20 wt % or less.

In addition, when the metal is Li and there are lithium silicates of $Li_2SiO_3$, and $Li_2Si_2O_5$ present in a negative electrode active material, the ratio of the weight of the $Li_2SiO_3$ to the weight of the $Li_2Si_2O_5$ may be 0.01 to 0.50, preferably 0.1 to 0.2. When $Li_2SiO_3$, and $Li_2Si_2O_5$ are present in a negative electrode active material in the above ratio, the mixed-phase structure in the negative active material may improve the compressive fracture strength of the negative active material to an appropriate level, so that lifespan properties may be more preferably improved.

The type and content of a metal silicate present in the negative active material may be measured through an X-ray diffraction profile through X-ray diffraction analysis.

The negative electrode active material of the present invention may further include a carbon coating layer formed on the silicon-based oxide particles. The carbon coating layer may suppress the volume expansion of silicon-based oxide particles, and may function as a protection layer for preventing side reactions with an electrolyte solution.

The carbon coating layer may be included in the negative electrode active material in an amount of 0.1 wt % to 10 wt %, preferably 3 wt % to 7 wt %, and when in the above range, it is preferable in that the carbon coating layer may prevent side reactions with an electrolyte solution while controlling the volume expansion of the silicon-based oxide particles to an excellent level.

The carbon coating layer may be an amorphous carbon coating layer. Specifically, the carbon coating layer may be formed by a chemical vapor deposition (CVD) method using at least one hydrocarbon gas selected from the group consisting of methane, ethane, and acetylene.

The compressive fracture strength of the negative electrode active material measured at a pressure of 100 mN is 170 MPa to 380 MPa.

In using silicon-based oxide particles, the negative electrode active material may adjust compressive fracture strength to the above-described level, thereby preventing damage, destruction, cracks, and the like of the negative electrode active material due to volume expansion/contraction caused by the charge/discharge of the negative electrode active material, and at the same time, preventing an active material destruction phenomenon during roll-pressing, which occurs as the negative electrode active material has excessively high compressive fracture strength.

When the compressive fracture strength of the negative electrode active material measured at a pressure of 100 mN is less than 170 MPa, It is not possible to prevent the problem of volume expansion and particle destruction due to the charge/discharge of a negative electrode active material. In addition, when the compressive fracture strength of the negative electrode active material is greater than 380 MPa, the negative active material is too hard, thereby deteriorating roll-pressing properties, and the negative active material is damaged during roll-pressing, so that lifespan properties may be rapidly deteriorated.

The compressive fracture strength of the negative electrode active material of the present invention measured at a pressure of 100 mN may be preferably 200 MPa to 310 MPa, more preferably 220 MPa to 250 MPa, and when in the above range, it is possible to further improve the control of volume expansion/contraction due to charge/discharge and the effect of improving roll-pressing properties, so that the lifespan properties of a battery may be improved.

The average particle diameter ($D_{50}$) of the negative electrode active material may be 0.1 μm to 20 μm, preferably 1 μm to 10 μm, and more preferably 2 μm to 8 μm in terms of ensuring the structural stability of an active material during charge/discharge, preventing the level of volume expansion/contraction from increasing due to the excessive increase in particle diameter, and preventing initial efficiency from decreasing due to an excessively small particle diameter.

The negative electrode active material may have a BET specific surface area of 0.5 $m^2/g$ to 7.5 $m^2/g$, preferably 4.6 $m^2/g$ to 7.5 $m^2/g$, and more preferably 4.8 $m^2/g$ to 7.0 $m^2/g$. When in the above range, the ratio of pores in the negative active material is reduced to an appropriate level, so that the negative electrode active material may have a desirable level of compressive fracture strength, and the effect of controlling volume expansion/contraction due to charge/discharge may be improved.

The BET specific surface area may be measured by using a BET specific surface area analysis device (Brunauer Emmett Teller, BET). Specifically, the BET specific surface area may be calculated from the adsorption amount of nitrogen gas under a liquid nitrogen temperature (77K) using the BELSORP-mino II of BEL Japan Co., Ltd.

Method for Preparing Negative Electrode Active Material

Also, the present invention provides a method for preparing the above-described negative electrode active material.

Specifically, the method for preparing a negative electrode active material of the present invention includes the steps of mixing silicon-based oxide particles and a metal-containing material, and heat-treating the mixture at 1,050° C. to 1,350° C.

The method for preparing a negative electrode active material of the present invention includes processes of mixing the silicon-based oxide particles and the metal-containing material and heat-treating the mixture in the above-described temperature range, so that it is possible to obtain a negative electrode active material having a metal distributed on the surface of and/or inside silicon-based oxide particles and having a compressive fracture strength of 170 MPa to 380 MPa, wherein the silicon-based oxide particles contain Si crystal grains having a crystal grain size of 3 nm to 20 nm. Accordingly, it is possible to simultaneously improve the lifespan properties and capacity properties of the negative electrode active material.

The method for preparing a negative electrode active material of the present invention includes a step of mixing silicon-based oxide particles and a metal-containing material.

The type, composition, size, and the like of the silicon-based oxide particles were described above.

The metal-containing material is a material used to distribute a metal on the surface of and/or inside silicon-based oxide particles by a process of heat-treating a mixture to be described later.

The metal-containing material may be at least one selected from the group consisting of a metal and a metal oxide, and preferably, may be a metal. Specifically, the metal-containing material may be at least one metal selected from the group consisting of Li, Mg, and Al, or a metal oxide thereof.

The silicon-based oxide particles and the metal-containing material may be subjected to solid mixing. Specifically, during the mixing, the silicon-based oxide particles and the metal-containing material may be in a solid state, and in this case, when forming a negative electrode active material through heat-treatment to be described later, the pore ratio and specific surface area in the negative electrode active material may be controlled to an appropriate level, thereby adjusting the compressive fracture strength of the negative active material to a desirable level. If the silicon-based oxide particles and the metal-containing material are mixed in a gaseous state, when forming a negative electrode active material through heat-treatment, the pore ratio in the negative electrode active material increases, the specific surface area increases, the compressive fracture strength of the negative electrode active material decreases, and it may be difficult to control the volume expansion of the negative active material due to charge/discharge.

The method for preparing a negative electrode active material of the present invention includes a step of heat-treating the mixture at 1,050° C. to 1,350° C.

When the mixture is heat-treated at a temperature of lower than 1,050° C., the compressive fracture strength of the negative electrode active material is too low and the size of Si crystal grains of silicon-based oxide particles cannot be increased to an appropriate level, so that there is a concern in that the deterioration of lifespan properties may be accelerated. When the mixture is heat-treated at a temperature of higher than 1,350° C., the compressive fracture strength of the negative electrode active material excessively increases, so that there is a concern in that the negative electrode active material may be destroyed or damaged during the roll-pressing of the negative electrode active material, and the crystal grain size of silicon-based oxide particles excessively increases, so that there is a concern in that changes in the internal structure of the active material is too severe to cause the deterioration in lifespan properties.

Specifically, the mixture may be heat-treated at 1,100° C. to 1,300° C., preferably 1,150° C. to 1,250° C. When the heat-treatment is performed in the above range, the above-described range of compressive fracture strength of a negative active material may be implemented, and the type and content of a metal silicate phase may be preferably adjusted, so that it is possible to improve the lifespan properties and capacity properties of the negative electrode active material.

The heat-treatment may be formed for 1 hour to 8 hours, preferably 2 hours to 6 hours. When in the above range, a metal silicate phase may be evenly distributed in the negative electrode active material, so that the implementation of the above-described compressive fracture strength range may be facilitated.

The method for preparing a negative electrode active material of the present invention may further include a step of forming a carbon coating layer on the silicon-based oxide particles after the heat-treatment step. The carbon coating layer may be formed on the silicon-based oxide particles to suppress the volume expansion of the negative electrode active material due to charge/discharge and to function as a protection layer for preventing side reactions with an electrolyte solution.

The step of forming the carbon coating layer may be performed by a chemical vapor deposition (CVD) method, and may specifically be performed by a chemical vapor deposition (CVD) method using at least one hydrocarbon gas selected from the group consisting of methane, ethane, and acetylene. The carbon coating layer may be formed on the silicon-based oxide particles to a uniform level according to the above method, so that volume expansion of the silicon-based oxide particles may be smoothly controlled and side reactions due to an electrolyte solution may be prevented.

The step of forming the carbon coating layer may be performed at 800° C. to 1,300° C., preferably 900° C. to 1,000° C.

Other descriptions of the carbon coating layer have been given above.

Negative Electrode

In addition, the present invention provides a negative electrode including the negative electrode active material described above.

Specifically, the negative electrode of the present invention includes a negative electrode current collector and a negative electrode active material layer formed on the negative electrode current collector, wherein the negative electrode active material layer includes a negative electrode active material including the negative electrode active material described above.

The negative electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the negative electrode current collector.

The negative electrode current collector may typically have a thickness of 3 μm to 500 μm.

The negative electrode current collector may have microscopic irregularities formed on the surface thereof to improve the adhesion of the negative electrode active material. For example, the negative electrode current collector may be used in various forms such as a film, a sheet, a foil, a net, a porous body, a foam, and a non-woven body.

The negative electrode active material layer is formed on the negative electrode current collector.

The negative electrode active material layer includes a negative electrode material, and the negative electrode material includes the above-described negative electrode active material.

The negative electrode active material may be included in a negative electrode to exhibit excellent capacity properties and lifespan properties. The negative electrode active material has been described above.

The negative electrode material may further include a carbon-based active material together with the above-described negative electrode material, and accordingly, the carbon-based active material having a low degree of volume expansion according to charge/discharge may reduce the degree of volume expansion of the entire negative electrode material.

The carbon-based active material may include at least one selected from the group consisting of graphite, artificial graphite, natural graphite, hard carbon, soft carbon, carbon black, acetylene black, Ketjen black, Super P, graphene, and fibrous carbon, and may preferably include at least one selected from the group consisting of artificial graphite and natural graphite.

The average particle diameter ($D_{50}$) of the carbon-based active material may be 5 μm to 35 μm, preferably 10 μm to 20 μm, in terms of ensuring structural stability during charge/discharge and decreasing side reactions with an electrolyte solution.

Specifically, in terms of simultaneously improving capacity properties and cycle properties, it is preferable that the negative electrode material uses both the negative electrode active material and the carbon-based active material. Specifically, it is preferable that the negative electrode material includes the negative electrode active material and the carbon-based active material in a weight ratio of 1:99 to 50:50, preferably 3:97 to 20:80.

The negative electrode material may be included in the negative electrode active material layer in an amount of 80 wt % to 99 wt %, preferably 90 wt % to 98.5 wt %.

The negative electrode active material layer includes a binder.

In terms of further improving electrode adhesion and imparting resistance sufficient for volume expansion/contraction of an active material, the binder may include at least one selected from the group consisting of styrene butadiene rubber (SBR), acrylonitrile butadiene rubber, acrylic rubber, butyl rubber, fluoro rubber, carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), and polyacryl amide (PAM). Preferably, in terms of having high strength, having excellent resistance to volume expansion/contraction of a silicon-based negative electrode active material, and imparting excellent flexibility to a binder to prevent twisting, bending, and the like of an electrode, it is preferable that the binder includes styrene-butadiene rubber.

The binder may be included in a negative electrode active material layer in an amount of 0.5 wt % to 10 wt %. When in the above range, it is preferable in terms of more effectively controlling the volume expansion of an active material.

The negative electrode active material layer may further include a conductive material. The conductive material may be used to improve conductivity of a negative electrode, and a conductive material which has conductivity without causing a chemical change is preferred. Specifically, the conductive material may be at least one selected from the group consisting of natural graphite, artificial graphite, carbon black, acetylene black, Ketjen black, channel black, furnace black, lamp black, thermal black, conductive fiber, carbon nanotube (CNT), fluorocarbon powder, aluminum powder, nickel powder, zinc oxide, potassium titanate, titanium oxide, and a polyphenylene derivative, and may preferably include carbon black in terms of implementing high conductivity.

The conductive material may be included in the negative electrode active material layer in an amount of 0.5 wt % to 10 wt %.

The thickness of the negative electrode active material layer may be 30 μm to 100 μm, preferably 40 μm to 80 μm in terms of increasing electrical contact for components of a negative electrode material.

The negative electrode may be manufactured by dispersing a negative electrode material, a binder, and a conductive material in a solvent for forming a negative electrode slurry to prepare a negative electrode slurry, coating the negative electrode slurry on the negative electrode current collector, followed by drying and roll-pressing.

The solvent for forming a negative electrode slurry may include at least one selected from the group consisting of distilled water, ethanol, methanol, and isopropyl alcohol, preferably distilled water, in terms of facilitating the dispersion of components.

Secondary Battery

The present invention provides a secondary battery including the negative electrode described above, specifically, a lithium secondary battery.

Specifically, the secondary battery according to the present invention includes the negative electrode described above, a positive electrode opposing the negative electrode, a separator interposed between the negative electrode and the positive electrode, and an electrolyte.

The positive electrode may include a positive electrode current collector and a positive electrode active material layer formed on the positive electrode current collector.

The positive electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the positive electrode current collector.

The positive electrode current collector may typically have a thickness of 3 μm to 500 μm.

The positive electrode current collector may have microscopic irregularities formed on the surface thereof to improve the adhesion of the positive electrode active material. For example, the positive electrode current collector may be used in various forms such as a film, a sheet, a foil, a net, a porous body, a foam, and a non-woven body.

The positive electrode active material layer may include a positive electrode active material.

The positive electrode active material is a compound capable of reversible intercalation and de-intercalation of lithium, and specifically, may include a lithium transition metal composite oxide including at least one transition metal selected from the group consisting of nickel, cobalt, manganese, and aluminum, and lithium, preferably a lithium transition metal composite oxide including a transition metal containing nickel, cobalt, or manganese, and lithium.

More specifically, the lithium transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (wherein 0<Y<1), $LiMn_{2-z}Ni_zO_4$ (wherein 0<Z<2), etc.), a lithium-nickel-cobalt-based oxide (e.g., $LiNi_{1-Y1}Co_{Y1}O_2$ (wherein 0<Y1<1), etc.), a lithium-manganese-cobalt-based oxide (e.g., $LiCo_{1-Y2}Mn_{Y2}O_2$ (wherein 0<Y2<1), $LiMn_{2-Z1}Co_{Z1}O_4$ (wherein 0<Z1<2, etc.), a lithium-nickel-manganese-cobalt-based oxide (e.g., $Li(Ni_p Co_q Mn_{r1})O_2$ (wherein 0<p<1, 0<q<1, 0<r1<1, p+q+r1=1) or $Li(Ni_{p1}Co_{q1}Mn_{r2})O_4$ (wherein 0<p1<2, 0<q1<2, 0<r2<2, p1+q1+r2=2, etc.), or a lithium-nickel-cobalt-transition metal (M) oxide (e.g., $Li(Ni_{p2}Co_{q2}Mn_{r3}A_{s2})O_2$ (wherein M is selected from the group consisting of Al, Fe, V, Cr, Ti, Ta, Mg, and Mo, and p2, q2, r3, and s2 are each an atomic fraction of independent elements, and 0<p2<1, 0<q2<1, 0<r3<1, 0<s2<1, p2+q2+r3+s2=1, etc.) and the like, and any one thereof or a compound of two or more thereof may be included. Among these, in terms of being able to increase the capacity and stability of a battery, the lithium transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.), and the like. When considering an remarkable improvement effect according to the control of type and content ratio of constituent elements forming a lithium transition metal composite oxide, the lithium transition metal composite oxide may be $Li(Ni_{0.6}Mn_{0.2}Co_{0.2})O_2$, $Li(Ni_{0.5}Mn_{0.3}Co_{0.2})O_2$, Li(Ni$_{0.7}$Mn$_{0.15}$Co$_{0.15}$)O$_2$, or Li(Ni$_{0.8}$Mn$_{0.1}$Co$_{0.1}$)O$_2$, and the like, and any one thereof or a mixture of two or more thereof may be used.

The positive electrode active material may be included in the positive electrode active material layer in an amount of 80 wt % to 99 wt %, preferably 92 wt % to 98.5 wt % in consideration of exerting sufficient capacity of the positive electrode active material.

The positive electrode active material layer may further include a binder and/or a conductive material in addition to the positive electrode active material described above.

The binder is a component for assisting in binding of an active material, a conductive material, and the like, and binding to a current collector, and specifically, may include at least one selected from the group consisting of a polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, and fluorine rubber, preferably polyvinylidene fluoride.

The binder may be included in the positive electrode active material layer in an amount of 1 wt % to 20 wt %, preferably 1.2 wt % to 10 wt % in terms of securing sufficient binding force between components such as a positive electrode active material.

The conductive material may be used to assist and improve conductivity in the secondary, and is not particularly limited as long as it has conductivity without causing a chemical change. Specifically, the conductive material may include graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; fluorocarbon; metal powder such as aluminum powder, and nickel powder; a conductive whisker such as zinc oxide and potassium titanate; a conductive metal oxide such as titanium oxide; and a polyphenylene derivative, and may preferably include carbon black in terms of improving conductivity.

The conductive material may be included in the positive electrode active material layer in an amount of 1 wt % to 20 wt %, preferably 1.2 wt % to 10 wt % in terms of securing sufficient electrical conductivity.

The thickness of the positive electrode active material layer may be 30 μm to 400 μm, preferably 50 μm to 110 μm.

The positive electrode may be manufactured by coating a positive electrode active material slurry including a positive electrode active material, and selectively, a binder, a conductive material, and a solvent for forming a positive electrode slurry on the positive electrode current collector, followed by drying and roll-pressing.

The solvent for forming a positive electrode slurry may include an organic solvent such as N-methyl-2-pyrrolidone (NMP), and may be used in an amount such that a preferred viscosity is achieved when the positive electrode active material, and selectively, the binder, the conductive material, and the like are included. For example, the solvent for forming a positive electrode slurry may be included in the positive electrode slurry in an amount such that the concentration of a solid including the positive electrode active material, and selectively, the binder and the conductive material is 50 wt % to 95 wt %, preferably 70 wt % to 90 wt %.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Furthermore, a coated separator including a ceramic component or a polymer material may be used to secure heat resistance or mechanical strength, and may be used in a single-layered or a multi-layered structure, selectively.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond, an aromatic ring or ether bond); amides such as dimethylformamide; dioxolanes such as 1,3-dioxolane; or sulfolanes may be used. Among the above solvents, a carbonate-based solvent is preferable, and a mixture of a cyclic carbonate (e.g., ethylene carbonate or propylene carbonate) having a high ionic conductivity and a high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, LiPF$_6$, LiClO$_4$, LiAsF$_6$, LiBF$_4$, LiSbF$_6$, LiAlO$_4$, LiAlCl$_4$, LiCF$_3$SO$_3$, LiC$_4$F$_9$SO$_3$, LiN(C$_2$F$_5$SO$_3$)$_2$, LiN(C$_2$F$_5$SO$_2$)$_2$, LiN(CF$_3$SO$_2$)$_2$, LiCl, LiI, LiB(C$_2$O$_4$)$_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

According to a typical method for manufacturing a secondary battery, the secondary battery may be manufactured by interposing a separator between the negative electrode and the positive electrode described above, and then injecting an electrolyte solution thereto.

The secondary battery according to the present invention is useful for portable devices such as a mobile phone, a notebook computer, and a digital camera, and in the field of electric vehicles such as a hybrid electric vehicle (HEV), and in particular, may be preferably used as a component battery for a medium-to-large-sized battery module. Therefore, the present invention also provides a medium-to-large-sized battery module including the secondary battery as described above as a unit cell.

A medium-to-large-sized battery module as described above may be preferably applied to a power source for a device which requires high output and large capacity, such as an electric vehicle, a hybrid electric vehicle, and a power storage device.

Hereinafter, Examples of the present invention will be described in detail so that those skilled in the art may easily carry out the present invention. However, the present invention may be embodied in many different forms, and is not limited to Examples set forth herein.

EXAMPLES

Example 1: Preparation of Negative Electrode Active Material

As silicon-based oxide particles, SiO was prepared (Average particle diameter ($D_{50}$): 5 μm).

The silicon-based oxide particles, and as a metal-containing material, a Mg metal were mixed in a weight ratio of 88:7, and the mixture was heat-treated for 3 hours at 1,200° C. to prepare silicon-based oxide particles having Mg distributed on the surface thereof and/or thereinside.

Methane was subjected to chemical vapor deposition (CVD) at 950° C. as a hydrocarbon gas on the silicon-based oxide particles, thereby forming a carbon coating layer on the silicon-based oxide particles to prepare a negative electrode active material of Example 1.

In the negative electrode active material, the weight ratio of silicon-based oxide particles:Metal(Mg):carbon coating layer was 88:7:5.

Example 2: Preparation of Negative Electrode Active Material

A negative electrode active material of Example 2 was prepared in the same manner as in Example 1 except that the heat-treatment temperature was 1,120° C.

Example 3: Preparation of Negative Electrode Active Material

A negative electrode active material of Example 3 was prepared in the same manner as in Example 1 except that the heat-treatment temperature was 1,280° C.

Example 4: Preparation of Negative Electrode Active Material

A negative electrode active material of Example 4 was prepared in the same manner as in Example 1 except that the mixing amount of the mixture was adjusted such that the weight ratio of silicon-based oxide particles:Metal(Mg):carbon coating layer in the negative electrode active material was 91:4:5.

Example 5: Preparation of Negative Electrode Active Material

A negative electrode active material of Example 5 was prepared in the same manner as in Example 1 except that the mixing amount of the mixture was adjusted such that the weight ratio of silicon-based oxide particles:Metal(Mg):carbon coating layer in the negative electrode active material was 84:11:5.

Example 6: Preparation of Negative Electrode Active Material

A negative electrode active material was prepared in the same manner as in Example 1 except that a Li metal was used as the metal-containing material.

In the negative electrode active material, the weight ratio of silicon-based oxide particles:Metal(Li):carbon coating layer was 88:7:5.

Comparative Example 1: Preparation of Negative Electrode Active Material

As silicon-based oxide particles, SiO was prepared (Average particle diameter ($D_{50}$): 5 μm).

Methane was subjected to chemical vapor deposition (CVD) at 950° C. as a hydrocarbon gas on the silicon-based oxide particles, thereby forming a carbon coating layer on the silicon-based oxide particles to prepare a negative electrode active material of Comparative Example 1.

Comparative Example 2: Preparation of Negative Electrode Active Material

A negative electrode active material of Comparative Example 2 was prepared in the same manner as in Example 1 except that the heat-treatment temperature was 1,000° C.

Comparative Example 3: Preparation of Negative Electrode Active Material

A negative electrode active material of Comparative Example 3 was prepared in the same manner as in Example 1 except that the heat-treatment temperature was 1,400° C.

Comparative Example 4: Preparation of Negative Electrode Active Material

A negative electrode active material of Comparative Example 4 was prepared in the same manner as in Example 1 except that the mixing amount of the mixture was adjusted such that the weight ratio of silicon-based oxide particles:Metal(Mg):carbon coating layer in the negative electrode active material was 88:7:5, and the heat-treatment temperature was 1,400° C.

Comparative Example 5: Preparation of Negative Electrode Active Material

Silicon powder and silicon dioxide ($SiO_2$) powder were uniformly mixed at a molar ratio of 1:1 and then heat-treated at 1,400° C. in a decompression atmosphere of 1 torr to prepare an $SiO_x(0<x<2)$ gas, and Mg was heat-treated at 900° C. to prepare a Mg gas.

The $SiO_x(0<x<2)$ gas and the Mg gas were subjected to gas mixing and reacted for 3 hours at 1,300° C., cooled to 800° C. for 4 hours to be subjected to precipitation, and then pulverized with a jet mill to prepare silicon-based oxide particles containing Mg having an average particle diameter ($D_{50}$) of 5 μm.

The recovered silicon-based oxide particles were put into an electric furnace in a tube form, heated at a rate of 5° C./min, and then subjected to CVD processing at 950° C. for 2 hours under a mixed gas of argon (Ar) and methane ($CH_4$) to prepare silicon-based oxide particles containing Mg and having a carbon coating layer, and the silicon-based oxide particles were used as a negative electrode active material of Comparative Example 5. In the negative electrode active material, the weight ratio of silicon-based oxide particles:Metal(Mg):carbon coating layer was 88:7:5.

peak of Si, and then through the Scherrer equation. Specifically, the XRD analysis was performed under the following conditions.

<XRD Analysis Conditions>

1) Type and wavelength of light source: The X-ray wavelength generated from Cu kα was used, and the wavelength (λ) of the light source was 0.15406 nm.

2) Method for preparing sample: A sample for XRD analysis was preparing by placing 0.3 g of silicon-based oxide particles in a cylindrical holder having a diameter of 2.5 cm and a height of 2.5 mm, and performing flattening work with a slide glass such that the height of the sample in the holder is constant.

3) XRD analysis device setting conditions: SCAN TIME was set to 1 hour and 15 minutes, the measurement area was set to an area in which 2θ is 10° to 90°, and STEP TIME and STEP SIZE were set to perform scanning 2θ by 0.02° for

TABLE 1

| | Metal Type | Metal content (wt % based on negative electrode active material) | $MgSiO_3$ (wt % based on negative electrode active material) | $Mg_2SiO_4$ (wt % based on negative electrode active material) | $Li_2SiO_3$ (wt % based on negative electrode active material) | $Li_2Si_2O_5$ (wt % based on negative electrode active material) | Heat-treatment temperature (° C.) | Si crystal grain size (nm) | Compressive fracture strength (MPa) | BET specific surface area (m²/g) |
|---|---|---|---|---|---|---|---|---|---|---|
| Example 1 | Mg | 7 | 15 | 10 | — | — | 1,200 | 10 | 230 | 5.2 |
| Example 2 | Mg | 7 | 18 | 8 | — | — | 1,120 | 7 | 200 | 5.4 |
| Example 3 | Mg | 7 | 12 | 13 | — | — | 1,280 | 12 | 300 | 5.1 |
| Example 4 | Mg | 4 | 10 | 5 | — | — | 1,200 | 8 | 190 | 5.4 |
| Example 5 | Mg | 11 | 20 | 17 | — | — | 1,200 | 11 | 320 | 5.0 |
| Example 6 | Li | 7 | — | — | 5 | 40 | 1,200 | 7 | 210 | 4.7 |
| Comparative Example 1 | — | — | — | — | — | — | — | 3 | 130 | 4.5 |
| Comparative Example 2 | Mg | 7 | 29 | 0 | — | — | 1,000 | 5 | 150 | 5.5 |
| Comparative Example 3 | Mg | 22 | 40 | 35 | — | — | 1,400 | 32 | 420 | 5.3 |
| Comparative Example 4 | Mg | 7 | 15 | 11 | — | — | 1,400 | 25 | 260 | 5.7 |
| Comparative Example 5 | Mg | 7 | 15 | 10 | — | — | — | 9 | 135 | 8.3 |

(1) Compressive Fracture Strength

Compressive fracture strength was measured using a particle strength meter (Trade name: MCT, manufacturer: SHIMIDZU) under the condition of 100 mN. The results are shown in Table 1 above.

(2) Measurement of Content of Metal and Metal Silicate

The content of a metal silicate was measured using an X-ray diffraction (XRD) device (Trade name: D4-endavor, manufacturer: bruker). The content was measured by analysis conditions that adjust FDS to 0.5 and perform measurement for 87.5 seconds per 0.02° in 2θ(2theta) 15° to 90° area. The measurement results were analyzed for X-ray diffraction profiles by Rietveld refinement using X-ray diffraction pattern analysis software. The content of a metal and the metal silicate were measured by the analysis. The results are shown in Table 1 above.

(3) Measurement of Size of Si Crystal Grains of Silicon-Based Oxide Particles

The size of Si crystal grains of silicon-based oxide particles was measured by performing XRD analysis using an X-ray diffraction (XRD) device (Trade name: D4-endavor, manufacturer: bruker), measuring the (220) plane each second. At this time, in order to measure the (220) plane peak of Si, a peak of an area in which 2θ is 45° to 50° was measured.

Thereafter, using the Scherrer equation below, the crystal grain size of silicon of the silicon-based oxide particles was calculated.

$$\text{Si crystal grain size} = K \times \lambda / \text{FWHM} \times \cos\theta \quad \text{[Scherrer equation]}$$

In the above Equation, K is the Scherrer constant of 0.89, λ is the wavelength of a light source of 0.15406 nm, FWHM is the full width of half maximum of the (220) plane peak of Si at the time of XRD analysis and was calculated using the Lorentz function, and Cos θ is the cosine value of an angle θ corresponding to the (220) plane peak of Si.

(4) Measurement of BET specific surface area of negative electrode active material The BET specific surface area of the negative electrode active material was measured by using a BET specific surface area analysis device (BELSORP-mino II) of BEL Japan Co., Ltd., and the BET specific surface area of the negative electrode active material was calculated through the amount of nitrogen gas adsorption at a liquid nitrogen temperature (77 K) of the negative electrode active material.

EXPERIMENTAL EXAMPLES

<Manufacturing of Negative Electrode>

As a negative electrode material, a mixture in which the composite negative electrode active material prepared in Example 1 and graphite (Average particle diameter ($D_{50}$): 20 μm) as a carbon-based active material were mixed in a weight ratio of 15:85 was used.

The negative electrode material, styrene-butadiene rubber (SBR) as a binder, Super C65 as a conductive material, and carboxymethyl cellulose (CMC) as a thickener were mixed in a weight ratio of 96:2:1:1, and the mixture was added to distilled water as a solvent for forming a negative electrode slurry to prepare a negative electrode slurry.

The negative electrode slurry was coated on one surface of a copper current collector (Thickness: 15 μm), which is a negative electrode current collector, with a loading amount of 3 mAh/cm$^2$, roll-pressed, and then dried in a vacuum oven at 130° C. for 10 hours to form a negative electrode active material layer (Thickness: 60 μm), which was used as a negative electrode according to Example 1 (Thickness of the negative electrode: 75 μm).

In addition, a negative electrode of each of Examples 2 to 6 and Comparative Examples 1 to 5 was manufactured in the same manner as in Example 1 except that the composite negative electrode active material of each of Examples 2 to 6 and Comparative Examples 1 to 5 was used instead of the composite negative electrode active material of Example 1.

<Manufacturing of Secondary Battery>

LiMn$_2$O$_4$ as a positive electrode active material, Denka black as a conductive material, and PVdF as a binder were added to N-methylpyrrolidone (NMP) in a weight ratio of 96.5:2.0:1.5 to prepare a positive electrode slurry. The positive electrode slurry was applied, roll-pressed, and dried on an aluminum current collector to manufacture a positive electrode.

A porous polyethylene separator was interposed between the negative electrode of each of Examples 1 to 6 and Comparative Examples 1 to 5 manufactured above and the positive electrode, and an electrolyte solution was injected thereto to manufacture a pouch-type secondary battery.

As the above electrolyte solution, a solution prepared by dissolving vinylene carbonate (VC) to 1.5 wt % in a solution in which ethyl methyl carbonate (EMC) and ethylene carbonate (EC) were mixed in a volume ratio of 7:3, followed by dissolving LiPF$_6$ to a concentration of 1 M therein was used.

Experimental Example 1: Lifespan Properties Evaluation

<Capacity Retention Rate Evaluation>

The secondary battery manufactured in each of Examples 1 to 6 and Comparative Examples 1 to 5 was subjected to cycle capacity retention rate evaluation using an electrochemical charge/discharge device.

The cycle capacity retention rate was calculated by performing charging and discharging at 0.1 C for the first cycle and the second cycle and performing charging and discharging at 0.5 C from the third cycle (Charging condition: CC/CV, 5 mV/0.005 C cut-off, discharging condition: CC, 1.5 V cut off).

The capacity retention rate was calculated as follows.

Capacity retention rate (%)={(Discharge capacity at $N$-th cycle)/(Discharge capacity at the first cycle)}×100

(In the above Equation, N is an integer of 1 or greater.)

The capacity retention rate (%) of the 100th cycle is shown in Table 2 below.

TABLE 2

|  | 100th cycle capacity retention rate (%) |
|---|---|
| Example 1 | 92 |
| Example 2 | 90 |
| Example 3 | 91 |
| Example 4 | 89 |
| Example 5 | 90 |
| Example 6 | 85 |
| Comparative Example 1 | 81 |
| Comparative Example 2 | 83 |
| Comparative Example 3 | 76 |
| Comparative Example 4 | 78 |
| Comparative Example 5 | 82 |

Referring to Table 2, the negative electrode active material of each of Examples 1 to 6, whose compressive fracture strength was adjusted to a desired level, improved the lifespan properties of a battery to an excellent level compared to Comparative Examples.

Experimental Example 2: Swelling Evaluation

The secondary battery manufactured in each of Examples 1 to 6 and Comparative Examples 1 to 5 was subjected to swelling evaluation.

Specifically, the secondary battery was charged and discharged under the same conditions as in Experimental Example 1 to measure the thickness of the secondary battery in a full-charge state at the 50th cycle.

The swelling was evaluated as the ratio (%) of the thickness of the secondary battery in a full-charge state at the 50th cycle to the thickness of the secondary battery before performing charge/discharge as follows. The results are shown in Table 3 below.

Swelling (%)={(Thickness of secondary battery in full-charge state at 50th cycle)/(Thickness of secondary battery before cycle charge/discharge)}×100

TABLE 3

|  | Swelling (%) |
|---|---|
| Example 1 | 45 |
| Example 2 | 54 |
| Example 3 | 55 |
| Example 4 | 54 |
| Example 5 | 55 |
| Example 6 | 57 |
| Comparative Example 1 | 68 |
| Comparative Example 2 | 65 |
| Comparative Example 3 | 74 |
| Comparative Example 4 | 71 |
| Comparative Example 5 | 66 |

Referring to Table 3, the negative electrode active material of each of Examples 1 to 6, whose compressive fracture strength was adjusted to a desired level, prevented the phenomenon of swelling to an excellent level compared to Comparative Examples.

Experimental Example 3: Evaluation of Initial Efficiency

<Evaluation of Initial Charge Capacity, Initial Discharge Capacity, and Initial Efficiency>

The initial charge capacity, initial discharge capacity, and initial efficiency (initial discharge capacity/initial charge capacity) of the secondary battery manufactured in each of Examples 1 to 6 and Comparative Examples 1 to 5 were evaluated using an electrochemical charge/discharge device.

The initial charge capacity, initial discharge capacity, and initial efficiency were measured by charging and discharging the secondary battery of each of Examples and Comparative Examples under the following charging and discharging conditions. The results are shown in Table 4.

Charging condition: 0.1 C, CC/CV(1.5 V, 0.05 C cut-off)
Discharging condition: 0.1 C, CC(0.05 V cut-off)

TABLE 4

|  | Initial discharge capacity (mAh/g) | Initial charge capacity (mAh/g) | Initial efficiency (%) |
| --- | --- | --- | --- |
| Example 1 | 516 | 562 | 91.8 |
| Example 2 | 517 | 564 | 91.7 |
| Example 3 | 514 | 559 | 91.9 |
| Example 4 | 518 | 567 | 91.4 |
| Example 5 | 512 | 555 | 92.3 |
| Example 6 | 514 | 560 | 91.8 |
| Comparative Example 1 | 540 | 571 | 94.6 |
| Comparative Example 2 | 501 | 565 | 88.8 |
| Comparative Example 3 | 471 | 525 | 89.7 |
| Comparative Example 4 | 505 | 550 | 91.8 |
| Comparative Example 5 | 500 | 563 | 88.8 |

Referring to Table 4, the negative electrode active material of each of Examples 1 to 6, whose compressive fracture strength was adjusted to a desired level, had excellent lifespan properties as well as improved initial efficiency.

The invention claimed is:

1. A negative electrode active material comprising:
   silicon-based oxide particles; and
   a metal distributed on a surface, inside, or on the surface of and the inside the silicon-based oxide particles,
   wherein compressive fracture strength measured at a pressure of 100 mN is 170 MPa to 380 MPa, and
   the silicon-based oxide particles contain Si crystal grains having a crystal grain size of 3 nm to 20 nm.

2. The negative electrode active material of claim 1, wherein the metal is included in the negative electrode active material in an amount of 0.1 wt % to 25 wt % with respect to 100 wt % of the negative electrode active material.

3. The negative electrode active material of claim 1, wherein the metal is at least one selected from the group consisting of Li, Mg, and Al.

4. The negative electrode active material of claim 1, wherein the metal is Mg, and the Mg is present in the negative electrode active material in a form of at least one magnesium silicate selected from the group consisting of $MgSiO_3$ and $Mg_2SiO_4$.

5. The negative electrode active material of claim 4, wherein:
   Mg is present in the negative electrode active material in the forms of $MgSiO_3$ and $Mg_2SiO_4$;
   $MgSiO_3$ is included in the negative electrode active material in an amount of 5 wt % to 25 wt % with respect to 100 wt % of the negative electrode active material; and
   $Mg_2SiO_4$ is included in the negative electrode active material in an amount of 3 wt % to 30 wt % with respect to 100 wt % of the negative electrode active material.

6. The negative electrode active material of claim 4, wherein Mg is present in the negative electrode active material in the forms of $MgSiO_3$ and $Mg_2SiO_4$, and a weight ratio of $Mg_2SiO_4$ to $MgSiO_3$ is 0.3 to 1.2.

7. The negative electrode active material of claim 1, wherein a Brunauer Emmett Teller (BET) specific surface area of the negative electrode active material is 0.5 $m^2/g$ to 7.5 $m^2/g$.

8. The negative electrode active material of claim 1, wherein the silicon-based oxide particles include a compound represented by Formula 1 below:

$SiO_x$ [Formula 1]

wherein in Formula 1, 0<x<2.

9. The negative electrode active material of claim 1, further comprising a carbon coating layer formed on the silicon-based oxide particles.

10. A method for preparing the negative electrode active material according to claim 1, the method comprising:
    mixing silicon-based oxide particles and a metal-containing material; and
    heat-treating the mixture at 1,050° C. to 1,350° C.,
    wherein the silicon-based oxide particles and the metal-containing material are subjected to solid mixing.

11. The method of claim 10, wherein the metal-containing material is at least one selected from the group consisting of a metal and a metal oxide.

12. The method of claim 10, wherein the heat-treatment is performed for 1 hour to 8 hours.

13. A negative electrode comprising:
    a negative electrode current collector; and
    a negative electrode active material layer formed on the negative electrode current collector, wherein
    the negative electrode active material layer includes a negative electrode material containing the negative electrode active material according to claim 1.

14. A secondary battery comprising:
    the negative electrode according to claim 13;
    a positive electrode opposing the negative electrode;
    a separator interposed between the positive electrode and the negative electrode; and
    an electrolyte.

* * * * *